US011226629B2

(12) United States Patent
Kwak et al.

(10) Patent No.: US 11,226,629 B2
(45) Date of Patent: Jan. 18, 2022

(54) ROBOT FOR DETECTING HUMAN HEAD AND CONTROL METHOD THEREOF

(71) Applicant: LG ELECTRONICS INC., Seoul (KR)

(72) Inventors: Seungchul Kwak, Seoul (KR); Jeongwoo Ju, Seoul (KR)

(73) Assignee: LG ELECTRONICS INC., Seoul (KR)

(*) Notice: Subject to any disclaimer, the term of this patent is extended or adjusted under 35 U.S.C. 154(b) by 339 days.

(21) Appl. No.: 16/550,804

(22) Filed: Aug. 26, 2019

(65) Prior Publication Data

US 2019/0377355 A1 Dec. 12, 2019

(30) Foreign Application Priority Data

Jul. 26, 2019 (KR) ........................ 10-2019-0090803

(51) Int. Cl.
*G05D 1/02* (2020.01)
*G06K 9/00* (2006.01)
(Continued)

(52) U.S. Cl.
CPC .......... *G05D 1/0214* (2013.01); *A47L 9/2826* (2013.01); *A47L 9/2852* (2013.01); *A47L 11/4011* (2013.01); *A47L 11/4061* (2013.01); *G05D 1/0238* (2013.01); *G06K 9/00664* (2013.01); *G06T 7/73* (2017.01); *A47L 2201/04* (2013.01); *G05D 2201/0203* (2013.01);
(Continued)

(58) Field of Classification Search
CPC ............... G05D 1/0214; G05D 1/0238; G05D 2201/0203; G05D 1/0251; G05D 2201/0215; G06K 9/00664; G06K 9/00362; G06T 2200/04; G06T 2207/10016; G06T 2207/30201; G06T 2207/30261; G06T 7/73; G06T 2207/10028; G06T 2207/30196; A47L 9/009; A47L 9/2805; A47L 9/2889; A47L 11/4011; A47L 9/2826; A47L 9/2852; A47L 11/4061; A47L 2201/04; B25J 9/1602; B25J 9/1666; B25J 9/1676; B25J 9/1697; B25J 11/0085
See application file for complete search history.

(56) References Cited

U.S. PATENT DOCUMENTS 9,224,060 B1 * 12/2015 Ramaswamy ..... G06K 9/00389
2006/0277571 A1 * 12/2006 Marks .................... A63F 13/10
725/37

(Continued)

*Primary Examiner* — Bhavesh V Amin
(74) *Attorney, Agent, or Firm* — Ked & Associates, LLP

(57) ABSTRACT

Disclosed is a robot and a control method thereof. The robot includes: a camera configured to acquire a depth image of a specific area; a processor configured to create an elevation map for the specific area based on the depth image, and determine whether a head of a person is in the specific area based on the elevation map. The processor, when determining whether the head of the person is in the specific area, is further configured to partition pixels of the elevation map into floor pixels corresponding to a floor area and non-floor pixels corresponding to a non-floor area using elevation values of the elevation map, set paths through the elevation map with a subset of the non-floor pixels as starting points for the paths, and determine whether the head of the person is in the specific area based on whether the paths converge.

20 Claims, 6 Drawing Sheets

200

(51) Int. Cl.

| | |
|---|---|
| ***G06T 7/73*** | (2017.01) |
| ***A47L 11/40*** | (2006.01) |
| ***A47L 9/28*** | (2006.01) |

(52) U.S. Cl.

CPC ............... *G06T 2207/10028* (2013.01); *G06T 2207/30196* (2013.01)

(56) References Cited

U.S. PATENT DOCUMENTS

| | | | | |
|---|---|---|---|---|
| 2010/0033427 | A1* | 2/2010 | Marks | G06F 3/0346 345/156 |
| 2018/0239144 | A1* | 8/2018 | Woods | A63F 13/212 |
| 2019/0377355 | A1* | 12/2019 | Kwak | A47L 11/4061 |
| 2020/0027275 | A1* | 1/2020 | Wan | G01V 3/165 |
| 2021/0125407 | A1* | 4/2021 | Pekelny | G06T 19/20 |

* cited by examiner

| 0 | 0 | 0 | 0 | 0 | 0 | 0 | 0 | 0 | 0 |
|---|---|---|---|---|---|---|---|---|---|
| 0 | 0 | 0 | 0 | 7 | 7 | 0 | 0 | 0 | 0 |
| 0 | 0 | 0 | 0 | 8 | 8 | 7 | 0 | 0 | 0 |
| 0 | 0 | 0 | 0 | 9 | 9 | 8 | 7 | 0 | 0 |
| 0 | 0 | 0 | 0 | 10 | 9 | 8 | 8 | 0 | 0 |
| 0 | 0 | 0 | 0 | 10 | 9 | 8 | 8 | 0 | 0 |
| 0 | 0 | 0 | 0 | 9 | 9 | 8 | 7 | 0 | 0 |
| 0 | 0 | 0 | 0 | 8 | 8 | 7 | 0 | 0 | 0 |
| 0 | 0 | 0 | 0 | 7 | 7 | 0 | 0 | 0 | 0 |
| 0 | 0 | 0 | 0 | 0 | 0 | 0 | 0 | 0 | 0 |

| 0 | 0 | 0 | 0 | 0 | 0 | 0 | 0 | 0 | 0 |
|---|---|---|---|---|---|---|---|---|---|
| 0 | 1 | 1 | 1 | 4 | 5 | 0 | 0 | 0 | 0 |
| 1 | 2 | 2 | 3 | 4 | 6 | 8 | 8 | 0 | 0 |
| 0 | 1 | 1 | 3 | 4 | 7 | 9 | 9 | 0 | 0 |
| 0 | 0 | 1 | 2 | 4 | 7 | 10 | 9 | 8 | 0 |
| 0 | 0 | 0 | 0 | 4 | 7 | 10 | 9 | 7 | 0 |
| 0 | 0 | 0 | 0 | 0 | 5 | 9 | 8 | 7 | 0 |
| 0 | 0 | 0 | 0 | 0 | 6 | 8 | 7 | 0 | 0 |
| 0 | 0 | 0 | 0 | 0 | 0 | 0 | 0 | 0 | 0 |
| 0 | 0 | 0 | 0 | 0 | 0 | 0 | 0 | 0 | 0 |

ROBOT FOR DETECTING HUMAN HEAD AND CONTROL METHOD THEREOF

CROSS-REFERENCE TO RELATED APPLICATION

This application claims priority under 35 U.S.C. § 119 to Korean Application No. 10-2019-0090803 filed on Jul. 26, 2019, whose entire disclosure is hereby incorporated by reference.

BACKGROUND

1. Field

The disclosure relates to a robot and a control method thereof.

2. Background

In general, a robot has been developed for the industrial purpose and has taken charge of a part of factory automation. Recently, applications of a robot have widely spread, medical robots, aerospace robots, and the like have been developed, and domestic robots which can be used in homes have been manufactured.

A representative example of a domestic robot is a robotic vacuum cleaner which is a kind of home appliance that moves autonomously in a predetermined area and sucks nearby dust or foreign substance to perform cleaning. Such a robotic vacuum cleaner generally includes a rechargeable battery, includes sensors such as a camera and a sensor for avoiding an obstacle during movement, moves autonomously moves, and performs cleaning.

A robotic vacuum cleaner has to move autonomously to avoid an object in homes. In order to avoid an object, a robotic vacuum cleaner has to detect presence of the object. However, a robotic vacuum cleaner may not detect presence of an object depending on conditions such as a height, a width, a color, and a material of the object.

Particularly, a robotic vacuum cleaner in the related art has poor recognition performance of a head of a person lying in a specific area. That is, a robotic vacuum cleaner in the related art cannot recognize hair of a human head and suck the hair. Accordingly, a robotic vacuum cleaner in the related art may cause inconvenience for a user.

BRIEF DESCRIPTION OF THE DRAWINGS

The embodiments will be described in detail with reference to the following drawings in which like reference numerals refer to like elements wherein.

DETAILED DESCRIPTION

Figure 1:
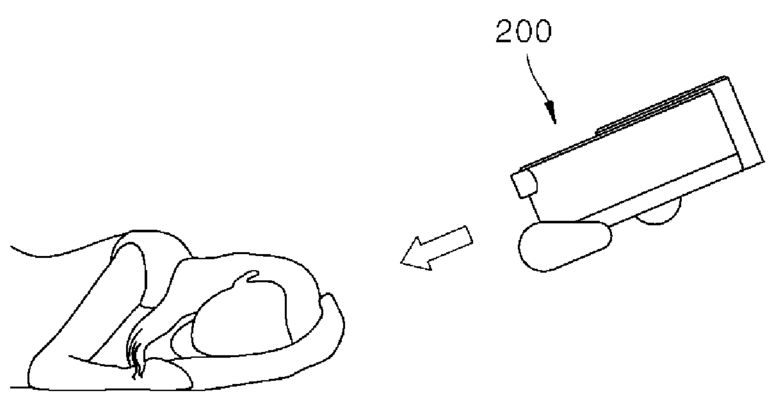
FIG. 1 is a diagram illustrating a problem in operation of a robot according to the related art.

Hereinafter, embodiments of the disclosure will be described in detail with reference to the accompanying drawings such that the disclosure can be easily implemented by those skilled in the art. The disclosure can be embodied in various forms and is not limited to the embodiments.

Parts which are not associated with description will be omitted in order to clearly describe the disclosure, and the same or similar elements over the entire specification will be referred to by the same reference signs. Some embodiments of the disclosure will be described in detail with reference to the accompanying drawings. In the drawings, the same elements will be referred to by as the same reference signs as possible. In the following description, when detailed description of the relevant known configurations or functions is determined to obscure the important point of the present disclosure, the detailed description will be omitted.

Terms such as first, second, A, B, (a), and (b) can be used to describe elements of the disclosure. These terms are merely used to distinguish one element from another element and the essence, order, sequence, number, or the like of the elements is not limited to the terms. If it is mentioned that an element is “coupled” or “connected” to another element, it should be understood that the element is directly coupled or connected to another element or still another element may “interposed” therebetween or the elements may be “coupled” or “connected” to each other with still another element interposed therebetween.

In embodying the disclosure, elements can be segmented and described for the purpose of convenience of explanation, these elements may be embodied in one device or module, or one element or may be divided and embodied into two or more devices or modules.

In the following description, a robot is collectively referred to as a device that moves in a specific area while performing a specific function. The function which is performed by the robot includes various functions which can be provided by a moving such as functions of cleaning, method guidance, and map creation and a security function. Particularly, for the purpose of convenience of explanation, it is assumed that a robot described in this specification is a robot that performs cleaning, that is, a robotic vacuum cleaner.

Figure 2:
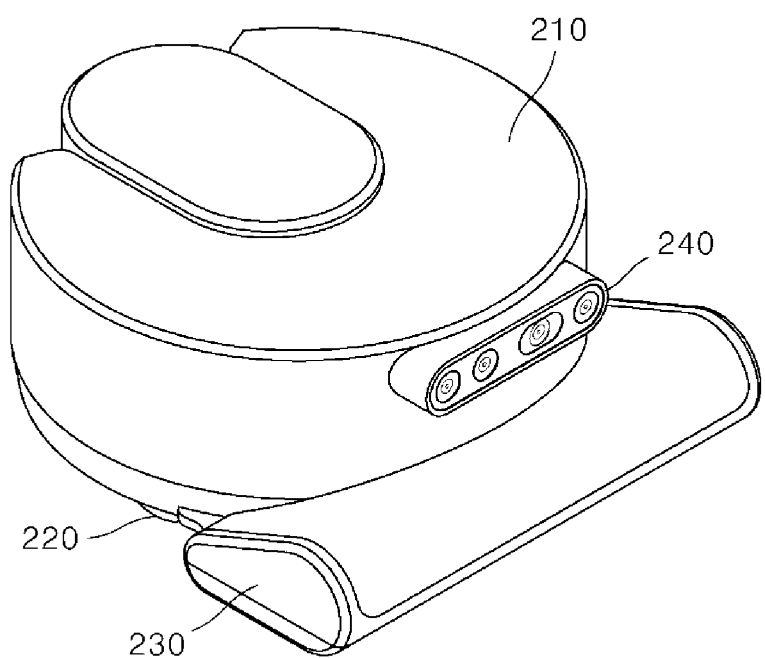
FIG. 2 is a diagram illustrating appearance of a robot according to an embodiment of the disclosure.

Referring to FIGS. 1 and 2, a robot 200 performs a function of cleaning a floor while moving autonomously in a specific area. Here, “cleaning a floor” includes an operation of sucking dust (including foreign substance) on the floor and an operation of wiping the floor with a cloth. In the following description, for the purpose of convenience of explanation, it is assumed that “cleaning of a floor” is an operation of sucking dust on the floor. However, the disclosure is not limited thereto. The robot 200 can recognize a human head and avoid sucking in hair on the head.

The robot 200 includes a body unit 210, a moving unit 220, a suction unit 230, and a depth camera 240. As will be described below, a control unit (not illustrated) for controlling moving and cleaning operations of the robot 200 is incorporated into the body unit 210, and a moving unit 220 (or driving wheel) for movement of the robot 200 is provided therein, and the moving unit 220 can selectively receive a driving force from a motor (not shown) to cause a wheel to rotate. The robot 200 can move forward, rearward, rightward, and leftward or rotate through the use of the moving unit 220.

The suction unit (or cleaning head or cleaning unit) 230 is provided to protrude from one side of the body unit 210 and sucks air including dust. For example, one side may be defined as a positive direction toward the body unit 210. As used herein, there direction of a “front” of robot may refer to a portion of robot 200 where the suction unit 230 is positioned.

The depth camera 240 is attached to one side of the body unit 210. Here, a direction of the front surface of the depth camera 240 can be set to face the floor of a specific space. For example, the depth camera 240 may be an infrared (IR) camera that emits infrared signals. The robot 200 may further include a sensor unit (see FIG. 3) in addition to or related to the depth camera 240.

Figure 3:
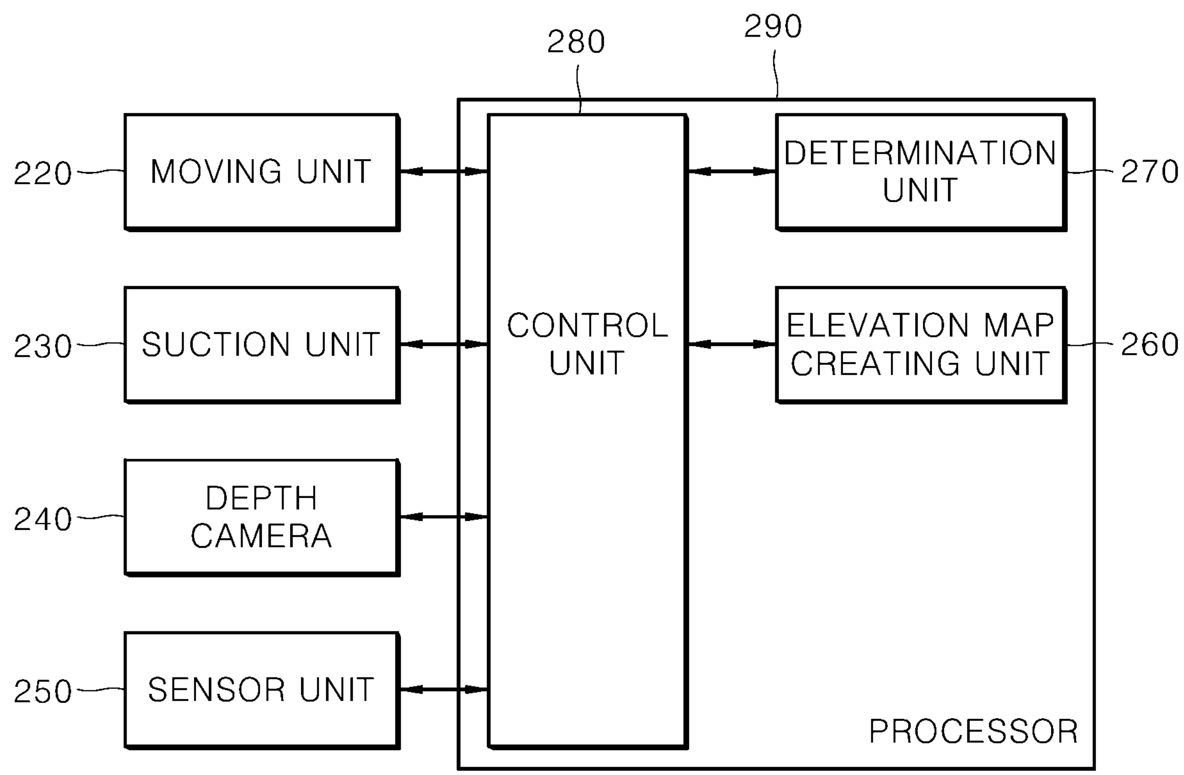
FIG. 3 is a block diagram illustrating a control relationship between principal elements of a robot according to an embodiment of the disclosure.

FIG. 3 is a block diagram illustrating a control relationship between principal elements of the robot 200 according to an embodiment of the disclosure. Referring to FIG. 3, the robot according to an embodiment of the disclosure includes an elevation map creating unit (or map creating module) 260, a determination unit (or determination module) 270, and a control unit (or control module) 280 in addition to the moving unit 220, the suction unit 230, the depth camera 240, and the sensor unit 250.

Here, the elevation map creating unit 260, the determination unit 270, and the control unit 280 may be modules which are logically partitioned in a processor 290. A module in this specification refers to a functional and structural combination of software for implementing the technical spirit of the disclosure. Hereinafter, functions by elements will be described in more detail.

The depth camera 240 acquires a depth image of a specific area. At this time, a depth image may be a gray-scale image. More specifically, the depth camera 240 is a device that measures a depth of a scene, that is, a distance between the camera and an object, and outputs an image. The depth camera 240 acquires a depth image of a scene using time-of-flight (TOF) technology. The TOF technology is a system that measures a distance by calculating a time in which an infrared signal is reflected by an object in a scene to be imaged and is returned. Depth information of a scene acquired using TOF technology is expressed as a depth image through a quantization process. That is, a space of a scene to be imaged is divided to have values of 0 to 255 and an appropriate elevation value is given to each sub space based on the measured distance of an object. On the other hand, the front surface of the depth camera 240 is disposed to face a floor of a specific space as described above and can acquire a depth image of an area associated with the floor.

The sensor unit 250 includes a plurality of sensors such as a sensor that detects an obstacle. For example, the sensor unit may include least one of an acceleration sensor, a gyro sensor, a light detection and ranging (LIDAR) sensor, an ultrasonic sensor, an radio-frequency (RF) sensor, a geomagnetic sensor, and/or a position sensitive device (PSD) sensor.

The elevation map creating unit 260 creates an elevation map for the specific area based on the depth image. An elevation map is a map in which elevation values of pixels in the depth image of the specific area are stored. The pixel values in the elevation map correspond to elevation values of the pixels in the depth image.

Figure 4:
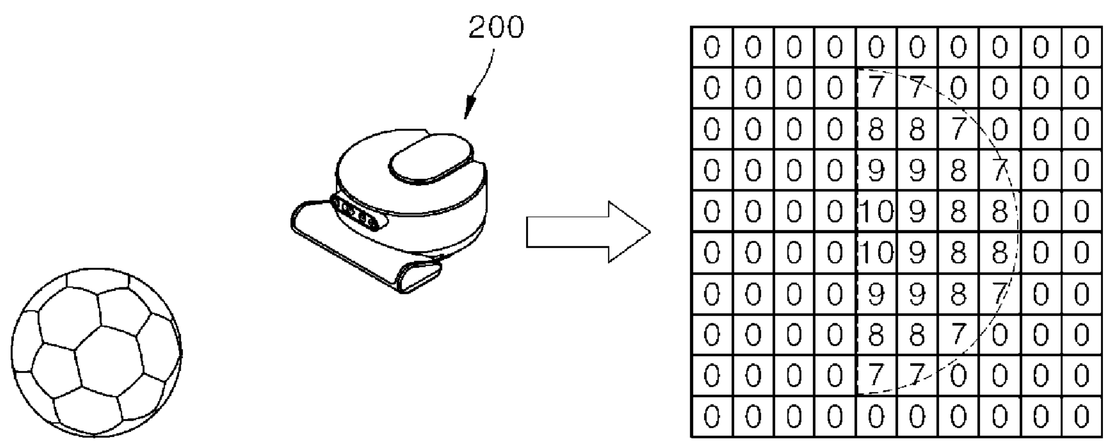
FIG. 4 is a diagram illustrating the concept of an elevation map according to an embodiment of the disclosure.
Figure 4:
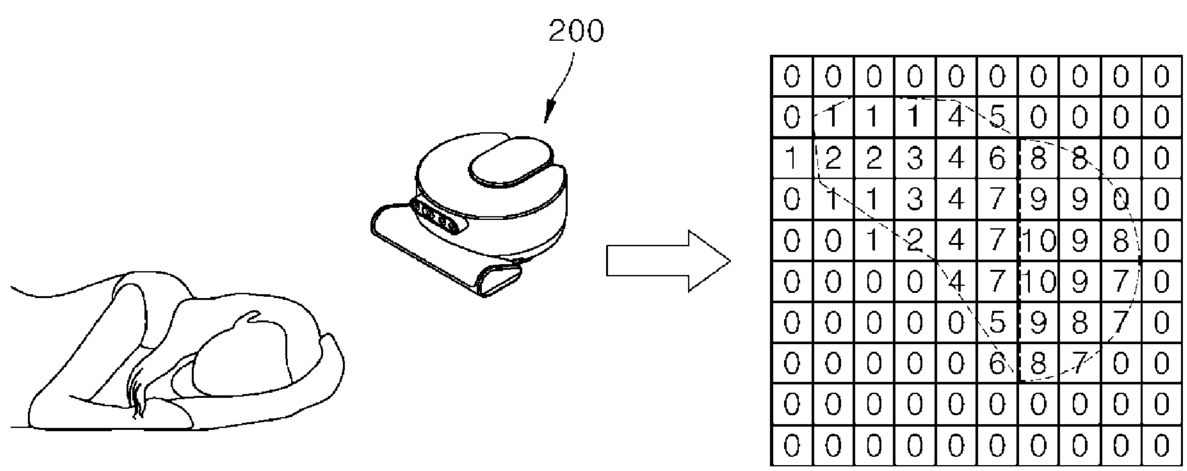

FIG. 4 illustrates the concept of an elevation map. When the depth camera 240 acquires a depth image of a soccer ball, the elevation map illustrated in the upper part of FIG. 4 can be created. When the depth camera 240 acquires a depth image of a head of a person lying in the specific, the elevation map illustrated in the lower part of FIG. 4 can be created. For example, each pixel in an elevation map may have a value of 0 to 10 and the height increases as the numeral increases. However, this is only an example of the disclosure and various elevation values may be set.

The determination unit 270 determines whether there is a head of a person lying in a specific area based on the elevation map. That is, the determination unit 270 determines whether there is a head of a person with hair in a specific area. The process of determination which is performed by the determination unit 270 will be described later in detail.

The control unit 280 controls operations of elements of the robot 200. That is, the control unit 280 controls a robot moving operation of the moving unit 220, controls a suction operation of the suction unit 230, and controls a depth image acquiring operation of the depth camera 240.

Figure 5:
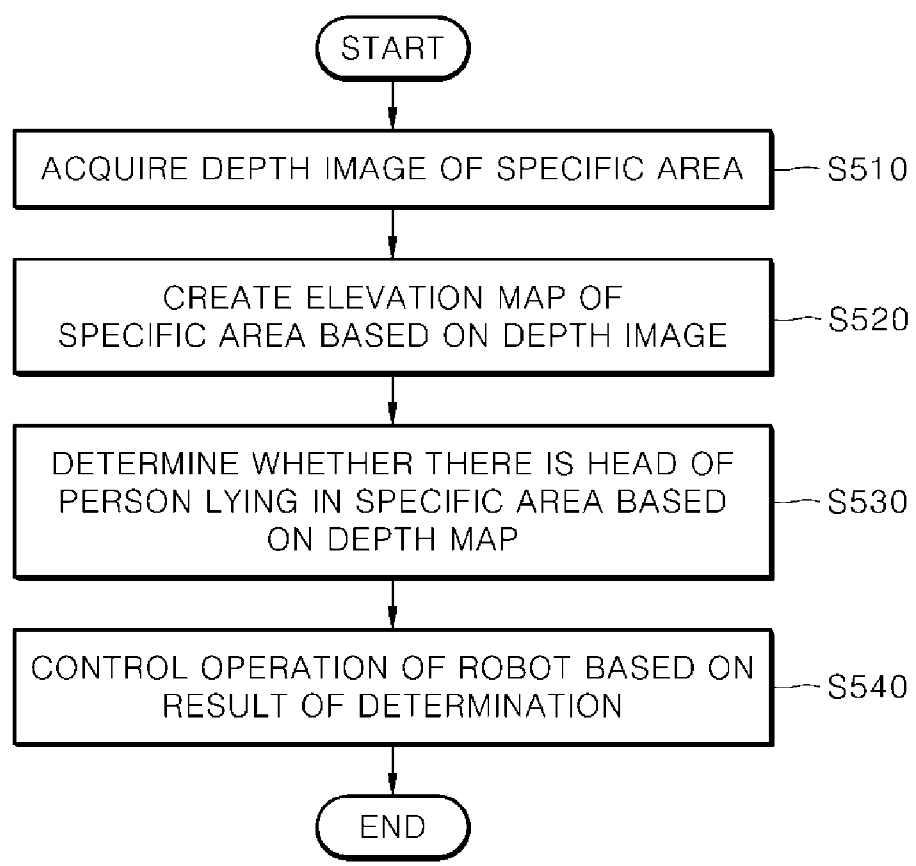
FIGS. 5 and 6 are flowcharts illustrating a flow of a method of controlling a robot according to an embodiment of the disclosure.
Figure 6:
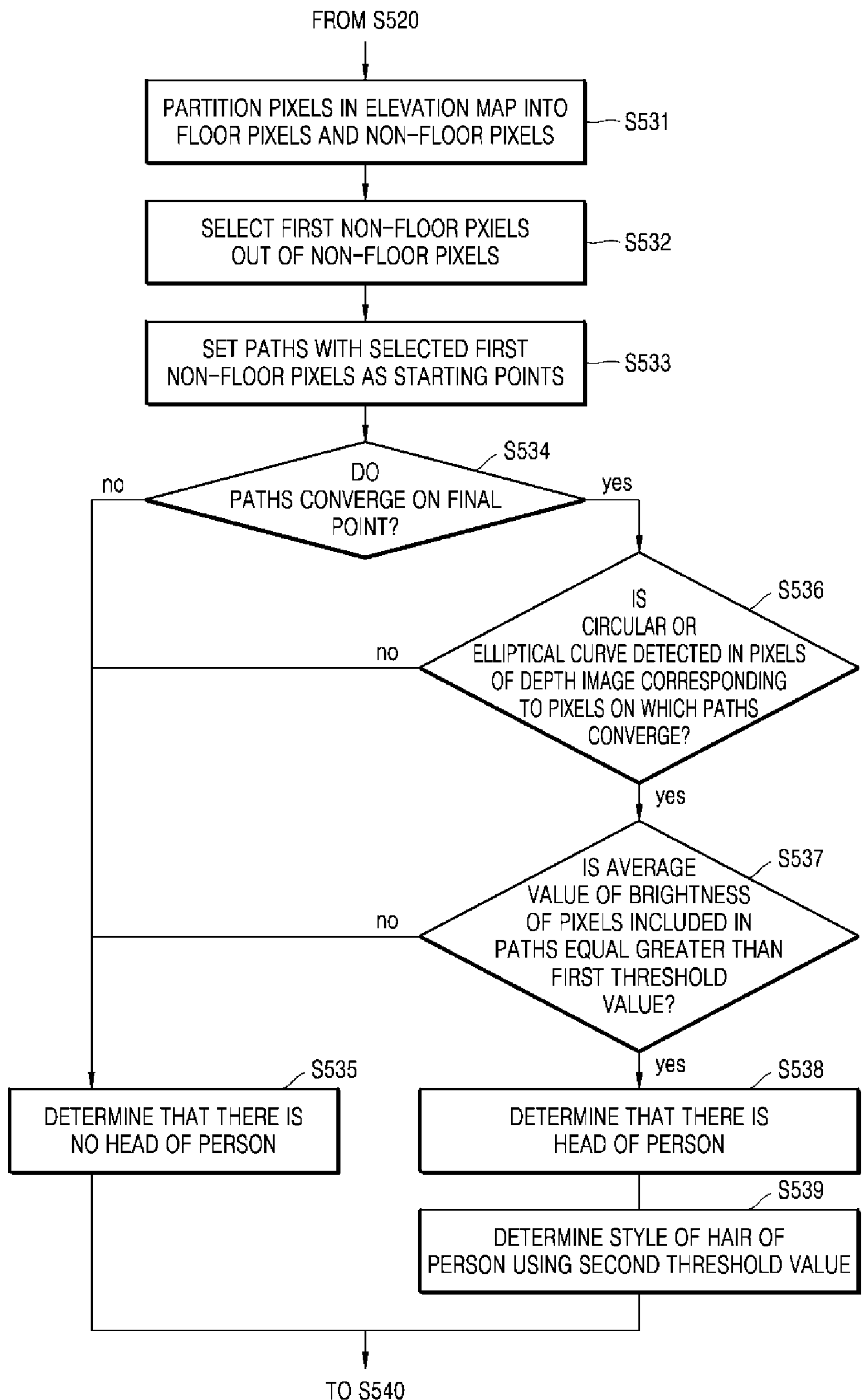

The operations of the robot 200 will be described below in more detail with reference to FIGS. 5 and 6. FIG. 5 is a flowchart illustrating a flow of a method of controlling a robot according to an embodiment of the disclosure. Hereinafter, the processes of steps will be described in detail.

The depth camera 240 acquires a depth image of a specific area (S510). That is, the robot 200 senses a forward environment of the robot 200 using the depth camera 240. At this time, the specific area may be an area including a floor area of a space.

Thereafter, the elevation map creating unit 260 creates an elevation map for the specific area based on the depth image (S520). That is, the elevation map creating unit 260 converts distance values acquired in the depth image into coordinates to acquire entire coordinate values and creates an elevation map in which elevation values are stored in pixels using the acquired entire coordinate values.

Subsequently, the determination unit 270 determines whether there is a head of a person lying in the specific area based on the elevation map (S530). This will be described later in more detail.

Finally, the control unit 280 controls the operation of the robot 200 based on the determination result from the determination unit 270. For example, when it is determined that there is a head of a person, the control unit 280 can control the robot 200 such that the robot moves separated a predetermined distance from the head of the person and suction strength decreases. For example, when it is determined that there an object other than a head of a person, the control unit 280 can control the robot 200 such that the robot moves without avoiding the object and suction strength is maintained.

On the other hand, a wiping unit that performs wiping may be provided instead of the suction unit 240, and when it is determined that there is a head of a person lying in the specific, the control unit 280 can control the operation of the wiping unit such that the operation strength of the wiping decreases. Generalizing this configuration, the control unit 280 can control the operation of the cleaning unit such that the operation strength for the cleaning function of the cleaning unit decreases.

Details of Step S530 will be described below in more detail with reference to FIG. 6, which is a flowchart illustrating a detailed flow of step S530. First, the determination unit 270 partitioned pixels of an elevation map into floor pixels constituting a floor area and non-floor pixels constituting a non-floor area using elevation value of the elevation map (S531). Various algorithms can be used to partition the floor pixels and the non-floor pixels. For example, referring to FIG. 4, the determination unit 270 sets pixels having an elevation value of 0 out of pixels in the elevation map as floor pixels and sets pixels having an elevation value of 1 or greater out of pixels in the elevation map as non-floor pixels.

Then, the determination unit 270 selects first non-floor pixels out of the non-floor pixels (S532). Here, the first non-floor pixels are pixels corresponding to starting points of paths which will be described below. According to an embodiment of the disclosure, the determination unit 270 selects outermost non-floor pixels which are located at the outermost in the elevation map out of the non-floor pixels and selects the first non-floor pixels by randomly selecting the outermost non-floor pixels. At this time, the outermost non-floor pixels correspond to non-floor pixels connected to floor pixels. For example, referring to FIG. 4, a dotted area represents non-floor pixels and the outermost pixels of the dotted area are the outermost non-floor pixels.

Thereafter, the determination unit 270 sets paths with the selected first non-floor pixels as starting points (S533). At this time, each path includes a plurality of pixels.

According to an embodiment of the disclosure, the determination unit 270 calculates an elevation value gradient with respect to each first non-floor pixel and sets the path in the direction in which the elevation value gradient has a maximum value. That is, a human head has a spherical shape, and an elevation value of the central part of the head of a person lying is greater than an elevation value of the outer part of the head of the person lying. Since Step S530 in the disclosure is a step of determining whether there is a spherical head and Step S533 is a step of determining whether an object has a spherical shape, the determination unit 270 sets paths in the direction in which the elevation value gradient has a maximum value with the first non-floor pixels (that is, outer part) as starting points.

The determination unit 270 determines whether the paths converge on a final point (pixel) (S534). At this time, when the paths do not converge, the determination unit 270 determines that there is no head of a person (S535). When the paths converge, the determination unit 270 determines whether a circular or elliptical curve in the pixels of the depth image corresponding to the pixels at which the paths converge is detected (S536). That is, Step S536 is a step of determining whether there is a head of a person or an object similar to a head of a person in the specific area.

At this time, when a circular or elliptical curve is not detected, the determination unit 270 determines that there is no head of a person (S535). When a circular or elliptical curve is detected, the determination unit 270 determines whether an average value of brightness of the pixels included in the paths is equal to or greater than a first threshold value (S537).

At this time, the first threshold value corresponds to an average value of brightness values of all the pixels in an IR image which is the depth image. When the average value of brightness of pixels included in the paths is less than the first threshold value, the determination unit 270 determines that there is an object (for example, a soccer ball) similar to a head of a person in the specific area and thus determines that there is no head of a person (S535). On the other hand, when the average value of brightness of pixels included in the paths is equal to or greater than the first threshold value, the determination unit 270 determines that there a head of a person (S537).

That is, when the paths converge on a final point, it is estimated that there is an object in the specific area, and Step S537 is a process of determining whether an object in the specific area is a head of a person or an object similar to a head of a person.

At this time, the depth camera 240 is constituted by an IR camera, and when an infrared signal is applied to a head of a person, the infrared signal is randomly reflected by hair. Accordingly, a plurality of pixels corresponding to the hair in the depth image have high brightness values.

Step S537 is based on the above description. When the average value of brightness of the pixels included in the paths is low (that is, less than the first threshold value), the determination unit 270 determines that an object in the specific area is an object similar to a head of a person. When the average value of brightness of the pixels included in the paths is high (that is, equal to or greater than the first threshold value), the determination unit 270 determines that an object in the specific area is a head of a person.

Subsequently, when it is determined that there is a head of a person, the determination unit 270 determines a style of hair of the head using a second threshold value (S539). More specifically, when differences between the elevation value of the floor pixels and elevation values of the non-floor pixels are equal to or greater than a second threshold value, the determination unit 270 determines that the hair of a person is short hair. When differences between the elevation value of the floor pixels and elevation values of the outermost non-floor pixels are less than the second threshold value, the determination unit 270 determines that the hair of a person is long hair.

At this time, the second threshold value is defined as a reference elevation value for distinguishing long hair and short hair and can be experimentally determined in advance. That is, the second threshold value may be defined as a median value of the average values of long hair/short hair which are acquired based on experiment. For example, when the average value of the elevation values of the outermost non-floor pixels of long hair is acquired as 1.6 by experiment and the average value of the elevation values of the outermost non-floor pixels of short hair is acquired as 8.4 by experiment, the second threshold value may be set to 5.

On the other hand, as described above, the operations of the moving unit 220 and the suction unit 230 may vary depending on the determination result of the style of hair of a person. For example, when the style of hair of a person lying in the specific area is long hair, the control unit 280 controls the robot 200 such that the robot is not closer within a first threshold distance from the outermost non-floor pixels. When the style of hair of a person lying in the specific area is short hair, the control unit 280 controls the robot 200 such that the robot is not closer within a second threshold distance from the outermost non-floor pixels. Here, the first threshold distance is greater than the second threshold distance.

Conclusively, the determination unit 270 determines whether there is a head of a person in a specific area depending on whether paths converge, and determines whether there is a head of a person using brightness values of the pixels included in the paths in addition to whether the paths converge. Accordingly, according to the disclosure, it is possible to determine whether an object in a specific area is a head of a person or an object similar to a head of a person.

The robot 200 according to the disclosure can effectively recognize a head of a person lying in a specific space and effectively control the operation of the robot by distinguishing a head of a person from an object similar to a head of a person. Particularly, when the robot 200 is a robotic vacuum cleaner, it is possible to prevent hair from being sucking into the robotic vacuum cleaner and to secure convenience of use of the robot 200 for a user.

When all elements of the embodiments of the disclosure are described to be combined into one element or to operate in combination, the disclosure is not limited to the embodiments and all the elements may be selectively combined to operate within the scope of the disclosure. All the elements may be embodied can be embodied as independent hardware pieces, respectively, or some or all of the elements may be selectively combined and may be embodied as a computer program including a program module that performs some or all functions combined into one or more hardware pieces. Codes or code segments of the computer program can be easily inferred by those skilled in the art. The computer program can be stored in a computer-readable recording medium and can be read and executed by a computer, whereby the embodiments of the disclosure can be realized. Examples of a storage medium having stored the computer program include storage mediums such as a magnetic recording medium, an optical recording medium, and a semiconductor recording medium. The computer program for realizing the embodiments of the disclosure includes a program module which is transmitted via an external device in real time.

While embodiments of the disclosure have been described above, various changes or modifications can be made thereon by those skilled in the art. Accordingly, it should be understood that such changes and modifications belong to the scope of the disclosure without departing from the scope of the disclosure.

An aspect of the disclosure provides a robot that can effectively recognize hair of a person lying in a specific space and a control method thereof. Another aspect of the disclosure provides a robot that can be effectively controlled by distinguishing an object such as a soccer ball similar to a human head from a human head and a control method thereof. The disclosure is not limited to the above-mentioned aspects, and other aspects of the disclosure, which are not mentioned above, can be understood from the following description and can be more apparently understood from embodiments of the disclosure. It can be easily understood that aspects of the disclosure will be able to be embodied by means described in the appended claims and combinations thereof.

In order to achieve the above-mentioned aspects, a robot according to an embodiment of the disclosure includes: a depth image acquiring unit configured to acquire a depth image of a specific area; an elevation map creating unit configured to create an elevation map for the specific area based on the depth image; and a determination unit configured to determine whether there is a head of a person lying in the specific area based on the elevation map. The determination unit is configured to partition pixels of the elevation map into floor pixels corresponding to a floor area and non-floor pixels corresponding to a non-floor area using elevation values of the elevation map, to set paths with first non-floor pixels out of the non-floor pixels as starting points, and to determine whether there is a head of a person depending on whether the paths converge.

A robot according to another embodiment of the disclosure includes: a depth image acquiring unit configured to acquire a depth image of a specific area; an elevation map creating unit configured to create an elevation map for the specific area based on the depth image; and a determination unit configured to determine whether there is a head of a person lying in the specific area based on the elevation map. The determination unit is configured to partition pixels of the elevation map into floor pixels corresponding to a floor area and non-floor pixels corresponding to a non-floor area using elevation values of the elevation map, to set paths with first non-floor pixels out of the non-floor pixels as starting points, and to determine whether there is a head of a person depending on whether the paths converge, whether a circular or elliptical curve is detected in the pixels of the depth image corresponding to the pixels on which the paths converge, and brightness values of the pixels included in the paths in the depth image.

A method of controlling a robot according to another embodiment of the disclosure includes: (a) causing a depth camera to acquire a depth image of a specific area; (b) causing an elevation map creating unit to create an elevation map for the specific area based on the depth image; (c) causing a determination unit to determine whether there is a head of a person lying in the specific area based on the elevation map; and (d) causing a control unit to control an operation of the robot based on the result of determination. The causing (c) includes: (c1) partitioning pixels of the elevation map into floor pixels corresponding to a floor area and non-floor pixels corresponding to a non-floor area using elevation values of the elevation map; (c2) setting paths with first non-floor pixels out of the non-floor pixels as starting points; and (c3) determining whether there is a head of a person depending on whether the paths converge.

According to the disclosure, it is possible to solve inconvenience for a user by effectively recognizing hair of a person lying in a specific space. According to the disclosure, it is possible to effectively control a robot d by distinguishing an object such as a soccer ball similar to a human head from a human head. Advantageous effects of the disclosure are not limited to the above description and should be understood to include all advantageous effects which can be derived from configurations described in the detailed description of the disclosure or the appended claims.

It will be understood that when an element or layer is referred to as being "on" another element or layer, the element or layer can be directly on another element or layer or intervening elements or layers. In contrast, when an element is referred to as being "directly on" another element or layer, there are no intervening elements or layers present. As used herein, the term "and/or" includes any and all combinations of one or more of the associated listed items.

It will be understood that, although the terms first, second, third, etc., may be used herein to describe various elements, components, regions, layers and/or sections, these elements, components, regions, layers and/or sections should not be limited by these terms. These terms are only used to distinguish one element, component, region, layer or section from another region, layer or section. Thus, a first element, component, region, layer or section could be termed a second element, component, region, layer or section without departing from the teachings of the present invention.

Spatially relative terms, such as "lower", "upper" and the like, may be used herein for ease of description to describe the relationship of one element or feature to another element(s) or feature(s) as illustrated in the figures. It will be understood that the spatially relative terms are intended to encompass different orientations of the device in use or operation, in addition to the orientation depicted in the figures. For example, if the device in the figures is turned over, elements described as "lower" relative to other elements or features would then be oriented "upper" relative to the other elements or features. Thus, the exemplary term "lower" can encompass both an orientation of above and below. The device may be otherwise oriented (rotated 90 degrees or at other orientations) and the spatially relative descriptors used herein interpreted accordingly.

The terminology used herein is for the purpose of describing particular embodiments only and is not intended to be limiting of the invention. As used herein, the singular forms "a", "an" and "the" are intended to include the plural forms as well, unless the context clearly indicates otherwise. It will be further understood that the terms "comprises" and/or "comprising," when used in this specification, specify the presence of stated features, integers, steps, operations, elements, and/or components, but do not preclude the presence or addition of one or more other features, integers, steps, operations, elements, components, and/or groups thereof.

Embodiments of the disclosure are described herein with reference to cross-section illustrations that are schematic illustrations of idealized embodiments (and intermediate structures) of the disclosure. As such, variations from the shapes of the illustrations as a result, for example, of manufacturing techniques and/or tolerances, are to be expected. Thus, embodiments of the disclosure should not be construed as limited to the particular shapes of regions illustrated herein but are to include deviations in shapes that result, for example, from manufacturing.

Unless otherwise defined, all terms (including technical and scientific terms) used herein have the same meaning as commonly understood by one of ordinary skill in the art to which this invention belongs. It will be further understood that terms, such as those defined in commonly used dictionaries, should be interpreted as having a meaning that is consistent with their meaning in the context of the relevant art and will not be interpreted in an idealized or overly formal sense unless expressly so defined herein.

Any reference in this specification to "one embodiment," "an embodiment," "example embodiment," etc., means that a particular feature, structure, or characteristic described in connection with the embodiment is included in at least one embodiment of the invention. The appearances of such phrases in various places in the specification are not necessarily all referring to the same embodiment. Further, when a particular feature, structure, or characteristic is described in connection with any embodiment, it is submitted that it is within the purview of one skilled in the art to effect such feature, structure, or characteristic in connection with other ones of the embodiments.

Although embodiments have been described with reference to a number of illustrative embodiments thereof, it should be understood that numerous other modifications and embodiments can be devised by those skilled in the art that will fall within the spirit and scope of the principles of this disclosure. More particularly, various variations and modifications are possible in the component parts and/or arrangements of the subject combination arrangement within the scope of the disclosure, the drawings and the appended claims. In addition to variations and modifications in the component parts and/or arrangements, alternative uses will also be apparent to those skilled in the art.

What is claimed is:

1. A robot comprising:

a camera configured to acquire a depth image of a specific area; and a processor configured to:

create an elevation map for the specific area based on the depth image, and determine whether a head of a person is in the specific area based on the elevation map, wherein the processor, when determining whether the head of the person is in the specific area, is further configured to:

partition pixels of the elevation map into floor pixels corresponding to a floor area and non-floor pixels corresponding to a non-floor area using elevation values of the elevation map, set paths through the elevation map with a subset of the non-floor pixels as starting points for the paths, and determine whether the head of the person is in the specific area based on whether the paths converge.

2. The robot according to claim 1, further comprising:

a driving wheel to move the robot;

a cleaning head to perform a cleaning function; and a processor configured to control the driving wheel and the cleaning head, wherein the processor is configured to control the driving wheel and the cleaning head such that the robot moves to avoid the head of the person, and a degree of the cleaning function decreases near the head of the person based on determining that the head of the person is in the specific area.

3. The robot according to claim 1, wherein the processor is configured to calculate an elevation value gradient with respect to each of the subset of the non-floor pixels and to set the paths in directions in which each of the elevation value gradients has a maximum value.

4. The robot according to claim 1, wherein the processor is configured to extract outermost non-floor pixels which are located on the outermost side on the elevation map among the non-floor pixels and to randomly select the subset of the non-floor pixels from the outermost non-floor pixels.

5. The robot according to claim 4, wherein the processor is configured to determine that the head of the person is in the specific area when the paths converge on ones of the pixels having a largest one of the elevation values in the elevation map.

6. The robot according to claim 5, wherein the processor is configured to determine whether the head of the person is in the specific area further based on whether a circular or elliptical curve is detected in the pixels of the depth image corresponding to the ones of the pixels where the paths converge and having the largest one of the elevation values.

7. The robot according to claim 5, wherein the processor is configured to determine whether the head of the person is in the specific area further based on brightness values of the pixels included in the paths in the depth image.

8. The robot according to claim 7, wherein the processor is configured to determine that the head of the person is in the specific area when an average value of the brightness values for ones of the pixels included in the converging paths is equal to or greater than a threshold value.

9. The robot according to claim 8, wherein the threshold value corresponds to an average value of the brightness values of the pixels in the depth image.

10. The robot according to claim 5, wherein the processor is configured to determine a style of the hair of the person when the processor determines that the head of the person is in the specific area, wherein the processor is configured to determine that the style of the hair of the person is short hair when differences between the elevation value of the floor pixels and the elevation values of the outermost non-floor pixels are equal to or greater than a threshold value, and wherein the processor is configured to determine that the style of the hair of the person is long hair when the differences between the elevation value of the floor pixels and the elevation values of the outermost non-floor pixels are less than the threshold value.

11. The robot according to claim 10, wherein second threshold value corresponds to a median value of an average value of the elevation values of the outermost non-bottom pixels associated with long hair and an average value of the elevation values of the outermost non-bottom pixels associated with short hair.

12. A robot comprising:

a camera configured to acquire a depth image of a specific area; and a processor configured to:

create an elevation map for the specific area based on the depth image; and determine whether a head of a person is in the specific area based on the elevation map, wherein the processor, when determining whether the head of the person is in the specific area is further configured to:

partition pixels of the elevation map into floor pixels corresponding to a floor area and non-floor pixels corresponding to a non-floor area using elevation values of the elevation map, set paths through the elevation map with a subset of the non-floor pixels as starting points, and determine whether the head of the person is in the specific area based on whether the paths converge, based on whether a circular or elliptical curve is detected in the pixels of the depth image corresponding to the pixels on which the paths converge, and based on brightness values of the pixels included in the paths in the depth image.

13. A method of controlling a robot, comprising:

acquiring a depth image of a specific area;

creating an elevation map for the specific area based on the depth image;

determining whether a head of a person is in the specific area based on the elevation map; and controlling an operation of the robot based on whether the head of the person is in the specific area, wherein determining whether the head of the person is in the specific area includes:

partitioning pixels of the elevation map into floor pixels corresponding to a floor area and non-floor pixels corresponding to a non-floor area using elevation values of the elevation map;

setting paths through the elevation map with a subset of the non-floor pixels as starting points; and determining whether the head of the person is in the specific area based on whether the paths converge.

14. The method according to claim 13, wherein setting the paths includes:

calculating an elevation value gradient with respect to each of the subset of the non-floor pixels, and setting the paths in directions in which each of the elevation value gradients has a maximum value.

15. The method according to claim 13, wherein determining whether the head of the person is in the specific area based on whether the paths converge includes:

extracting outermost non-floor pixels which are located on the outermost side on the elevation map among the non-floor pixels, and randomly selecting the subset of the non-floor pixels from the outermost non-floor pixels.

16. The method according to claim 13, wherein determining whether the head of the person is in the specific area based on whether the paths converge includes:

determining that the head of the person is in the specific area when the paths converge on ones of the pixels having the largest elevation in the elevation map, and a circular or elliptical curve is detected in the pixels of the depth image corresponding to the ones of the pixels where the paths converge and having the largest one of the elevation values.

17. The method according to claim 16, wherein determining whether the head of the person is in the specific area based on whether the paths converge includes:

determining whether the head of the person is in specific area based on brightness values of ones of the pixels included in the paths in the depth image, and determining that the head of the person is in the specific area when an average value of the brightness values of a group of the pixels included in the converging paths is equal to or greater than a threshold value.

18. The method according to claim 17, wherein the threshold value corresponds to an average value of the brightness values of the pixels in the depth image.

19. The method according to claim 15, further comprising:

determining a style of hair of the person when the head of the person is in the specific area, wherein determining the style of hair of the person includes:

determining that the hair of the person is short hair when differences between the elevation value of the floor pixels and the elevation values of the outermost non-floor pixels are equal to or greater than a threshold value, and determining that the hair of the person is long hair when the differences between the elevation value of the floor pixels and the elevation values of the outermost non-floor pixels are less than the threshold value.

20. The method according to claim 13, wherein the robot is a robotic vacuum cleaner that performs a cleaning function while moving, and wherein controlling an operation of the robot includes controlling the robot such that the robot moves to avoid the head of the person and a degree of the cleaning function decreases near the head of the person.

* * * * *